United States Patent [19]

Olsen

[11] 4,297,265

[45] Oct. 27, 1981

[54] SILICONE RUBBER COATING MATERIAL HAVING REDUCED SURFACE TENSION

[75] Inventor: Thomas O. Olsen, Wichita, Kans.

[73] Assignee: Otto Fabric, Inc., Sedgwick County, Kans.

[21] Appl. No.: 96,940

[22] Filed: Nov. 23, 1979

[51] Int. Cl.³ .............................................. C08K 5/01
[52] U.S. Cl. ..................... 260/33.6 SB; 260/29.1 SB; 260/37 SB; 260/42.37; 260/33.8 SB
[58] Field of Search ................. 260/29.1 SB, 33.6 SB, 260/33.8 SB, 37 SB, 42.37, 29.1 R; 106/287.34; 156/329; 252/28

[56] References Cited

U.S. PATENT DOCUMENTS

| | | | |
|---|---|---|---|
| 3,434,869 | 3/1969 | Davidson | 427/387 |
| 3,664,997 | 5/1972 | Chadha et al. | 260/33.6 SB X |
| 4,112,179 | 5/1978 | Maccalous et al. | 260/37 SB X |
| 4,144,216 | 3/1979 | Clark et al. | 260/33.6 SB X |

*Primary Examiner*—Ronald H. Smith
*Assistant Examiner*—Thurman K. Page
*Attorney, Agent, or Firm*—Lowe, Kokjer, Kurcher, Wharton & Bowman

[57] ABSTRACT

An improved silicone rubber coating composition is the subject of the invention. A method of reducing the surface tension of cured silicone rubber compositions is also contemplated. By utilizing a silicone rubber polymer dissolved in a suitable solvent at 50–70% concentration, $SiO_2$ may be introduced into the composition. $SiO_2$ in a quantity of 90–110% by weight of the polymer solution is utilized. Pigment may be added at 1–2% of the total formula weight if desired. The silicone is preferably at least 95% pure with an average particle size of 9 microns or less.

8 Claims, No Drawings

SILICONE RUBBER COATING MATERIAL HAVING REDUCED SURFACE TENSION

SUMMARY AND BRIEF DESCRIPTION OF THE INVENTION

This invention relates to protective coatings, generally, and more particularly to an improved silicone rubber coating composition and method of reducing surface tension of silicone coatings.

Silicone rubber based coating compositions have been widely used for a variety of purposes but most frequently in conjunction with a cloth substrate. Examples of the prior art teachings of the use of silicone rubber compositions include U.S. Pat. No. 2,751,314 issued June 19, 1956; U.S. Pat. No. 2,934,464 issued Apr. 26, 1960; U.S. Pat. No. 2,979,420 issued Apr. 11, 1961; and U.S. Pat. No. 3,455,762 issued July 15, 1969.

A disadvantage of prior silicone coating compositions has been the high surface tension of the cured coating. This renders the coating difficult to work with when applied to a substrate which is in turn intended to be secured to a surface. The high surface tension also subjects the finished coating to accumulation of dirt and other foreign particles. Satisfactory cleaning of the surface is not possible to achieve and prohibitively expensive to attempt.

It is therefore an object of the present invention to provide a silicone rubber coating composition and method wherein the surface tension is greatly reduced over conventional silicone rubber formulations.

Another important objective is to provide a silicone rubber composition which has improved adhesion over conventional formulations.

As a corollary to the foregoing objective, an aim of the invention is to provide a composition which may be applied directly to a surface to be protected or applied to a carrier substrate which may then be applied to the surface.

As still another corollary to the objective above stated, the present invention has as a primary goal to provide an improved silicone rubber coating composition with superior adhesion and reduced surface tension which will adhere to a wide variety of materials including wood, asphalt, concrete, plaster, cloth, and metal.

It is an important object of the invention to provide a silicone rubber coating composition having superior adhesion and reduced surface tension which is economically competitive with other silicone rubber coating compositions and easy to compound.

The basic process for manufacture of silicone rubber is described in U.S. Pat. No. 2,380,955 which is incorporated herein by reference. The term "silicone rubber" is meant to include any polysiloxane which has been cross linked. Most silicone rubbers are predominantly methyl polysiloxane but the polymer may also contain other organic group substituents on the polymer chain such as phenyl or vinyl. The most predominantly used cross-linking agents for heat cured silicone rubbers are organic peroxides, especially benzoyl peroxide and its derivaties. A number of silicone rubbers are disclosed in U.S. Pat. No. 2,448,756 which is incorporated herein by reference. A suitable product is dimethyl polysiloxane having a molecular weight of about 500,000.

In the preferred embodiment of the invention, the silicone rubber employed is a room temperature vulcanizing (RTV) silicone. All RTV silicones are characterized by cross-linking at room temperature through the addition of a catalyst or by moisture in the air.

The composition according to the present invention comprises a silicone polymer dissolved in a suitable nonreactive solvent with the solid polymer comprising 50 to 70% by weight of the combination. Suitable solvents include both aliphatic and aromatic hydrocarbons including heptane, hexane, pentane, naphtha, toluene, xylene, and chlorinated and florinated organic and inorganic solvents and silicone base solvents. Aliphatic solvents are preferred and optimum results have been obtained using naphtha. All solvents must be free of water and a dessicant may be employed for this purpose.

It has been discovered that the surface tension of the cured silicone rubber composition may be significantly reduced by the addition of 90–110% by weight $SiO_2$ (relative to the weight of the silicone rubber solution). The $SiO_2$ should have a minimum purity of 75% with 95% preferred. Optimum results are obtained with at least 99% pure $SiO_2$. The $SiO_2$ should have a particle size of less than 45 microns with an average particle size of 9 microns preferred.

1–2% by weight pigment (based upon total formula weight) may be added to the composition where coloring is desired.

One part RTV silicones are preferred for the coating composition of the present invention. RTV silicones are commonly provided as either one or two part systems. The one part systems require no mixing by the end user and rely upon moisture vapor from the air to achieve an end cure. The one part RTV silicones are commonly classified according to the by-product that is evolved during cure. The four most common by-products are acetic acid, oxime, alcohol and acetamide. Two component RTV silicone systems include the polymer (plus any pigment or fillers) and a catalyst. No moisture is required for using a one part RTV system. These two component systems are commonly classified as either condensation or addition based upon the reaction mechanism of the catalyst.

An acetic acid liberating RTV silicone is used in the preferred embodiment of the invention because of its good physical properties (including adhesion), stability and availability.

A preferred formulation for the composition of the invention is
 30% by weight RTV silicone rubber-acetic acid cure, s.g. 1.02–1.08
 20% by weight naphtha s.g. 0.75–0.85
 50% by weight 99% pure $SiO_2$ s.g. 2.5–2.8 pigment as desired for coloring is added to the total composition usually in a quantity of 1–2% by weight of the total.

The solid silicone is dissolved in the naphtha with proper mixing and $SiO_2$ and pigment are added gradually while continuing mixing. Application of the material is by brushing, doctor blade, spraying or the equivalent. Airless spraying equipment is readily available and is the preferred technique. The thickness of the application is dependent upon the requirements of the particular job.

The coating composition is useful in many construction applications for providing a waterproof wear resistant surface. It may be applied directly to metal, wood or concrete and masonary surfaces or over other coating materials. A particularly useful application is over existing roofing materials which are frequently petroleum or asphalt bases.

The material of the present invention is also useful for coating flexible substrates which are then used directly or secured to rigid substrates. Glass fiber cloth represents a particularly suitable material to use in conjunction with the present invention. An application of 2–30 mils of RTV silicone rubber composition according to the invention to woven glass fabric results in a highly useful structural member. Application is normally by dipping. The resulting product may be used to present a tension structure or air structure. Air structures are well known to those skilled in the art and a typical tension structure is shown in U.S. Pat. No. 3,651,609 incorporated herein by reference.

The coated glass cloth may be joined with other similarly coated pieces using an RTV silicone adhesive. In addition to building structures, the resulting product is useful as a material for constructing awnings, solar panels, pond and dam liners, interior building wall covers and other applications.

The greatly improved properties of the composition according to the present invention are attributable to the incorporation of $SiO_2$ which unexpectedly has been found to achieve the normally mutually exclusive properties of increased adhesion and reduced surface tension. The exact mechanism by which this result is achieved is not fully understood at this time. By greatly reducing the surface tension of the cured coating, however, a product is provided which will not attract and hold dirt in the manner which has heretofore characterized similar compounds. This renders the composition applicable to many uses not previously available.

It is to be understood that the foregoing description of the invention and the uses to which it may be put are only exemplary in nature. The scope of the invention is intended to be limited only by the appended claims.

I claim:

1. A composition for coating a substrate comprising:
   a first component comprising silicone rubber and a solvent therefor, said silicone rubber comprising between 50% and 70% by weight of said first component; and
   a second component comprising particulate $SiO_2$ having a particle size of less than 45 microns, said second component comprising 90 to 110% by weight of said first component.

2. A composition as set forth in claim 1, wherein said first component comprises RTV silicone rubber.

3. A composition as set forth in claim 2, wherein said solvent comprises an aliphatic hydrocarbon.

4. A composition as set forth in claim 2, wherein is included a quantity of pigment comprising about 1–2% by weight of the total of the other components.

5. A composition as set forth in claim 2, wherein said RTV silicone rubber has a specific gravity of about 1.02 to 1.08.

6. A composition as set forth in claim 2, wherein said $SiO_2$ has a specific gravity of about 2.5 to 2.8.

7. A method of reducing the surface tension of a silicone rubber coating composition comprising incorporating into the composition a quantity of particulate $SiO_2$ having a particle size of less than 45 microns, said quantity comprising between 90 and 110% by weight of said silicone rubber.

8. A method as set forth in claim 7, wherein said silicone rubber comprises an RTV silicone and an aliphatic hydrocarbon solvent therefor, said RTV silicone being present in said solvent in a quantity of at least 50% by weight.

* * * * *